(12) United States Patent
Mikan

(10) Patent No.: US 12,196,236 B2
(45) Date of Patent: Jan. 14, 2025

(54) GAS FLOW CONDITIONER IN THE FLOW BEND, ESPECIALLY FOR ULTRASONIC GAS METER

(71) Applicant: OIL & GAS METERING EQUIPMENT S.R.O., Restoky (CZ)

(72) Inventor: Jaroslav Mikan, Restoky (CZ)

(73) Assignee: OIL&GASMETERING EQUIPMENT S.R.O., Restoky (CZ)

( * ) Notice: Subject to any disclaimer, the term of this patent is extended or adjusted under 35 U.S.C. 154(b) by 15 days.

(21) Appl. No.: 17/622,729

(22) PCT Filed: Jun. 10, 2021

(86) PCT No.: PCT/IB2021/055096
§ 371 (c)(1),
(2) Date: Dec. 24, 2021

(87) PCT Pub. No.: WO2021/229554
PCT Pub. Date: Nov. 18, 2021

(65) Prior Publication Data
US 2023/0131371 A1    Apr. 27, 2023

(30) Foreign Application Priority Data
Jun. 29, 2020    (CZ) .............................. PV 2020-381

(51) Int. Cl.
*F15D 1/04*    (2006.01)
*F15D 1/06*    (2006.01)
*G01F 1/66*    (2022.01)

(52) U.S. Cl.
CPC ............... *F15D 1/04* (2013.01); *F15D 1/06* (2013.01); *G01F 1/662* (2013.01)

(58) Field of Classification Search
CPC ............... F15D 1/04; F15D 1/06; F01F 1/662
See application file for complete search history.

(56) References Cited

U.S. PATENT DOCUMENTS

| | | | | |
|---|---|---|---|---|
| 5,531,484 A | * | 7/1996 | Kawano .................. | F16L 43/00 285/179.2 |
| 6,290,266 B1 | * | 9/2001 | Kawano ................ | F16L 43/001 285/125.1 |
| 7,185,548 B2 | * | 3/2007 | Penlerick .............. | G01F 15/185 73/861.74 |

(Continued)

FOREIGN PATENT DOCUMENTS

| | | |
|---|---|---|
| EP | 1788259 A1 | 5/2007 |
| JP | 2009264906 A | 11/2009 |
| WO | 2020188396 A1 | 9/2020 |

OTHER PUBLICATIONS

International Search Report (Sep. 16, 2021) for corresponding International App. PCT/IB2021/055096.

*Primary Examiner* — David R Deal
(74) *Attorney, Agent, or Firm* — WRB-IP PLLC

(57) ABSTRACT

A gas flow conditioner in the flow bend in an ultrasonic flow meter has at least one longitudinal dividing plate provided in an inner space of the flow bend. The flow bend can be provided with an inlet curved section, a middle straight section, and an outlet curved section, wherein axes of the inlet curved section and the outlet curved section are in a parallel direction and connected to a pipe opening of size DN.

7 Claims, 3 Drawing Sheets

(56) References Cited

U.S. PATENT DOCUMENTS

| | | | | |
|---|---|---|---|---|
| 8,087,491 B2* | 1/2012 | Merchant | ................ | F01D 25/30 |
| | | | | 181/224 |
| 2015/0323364 A1* | 11/2015 | Sakaguchi | ................ | G01F 5/00 |
| | | | | 73/196 |
| 2020/0378414 A1* | 12/2020 | Leutwyler | ............. | F15D 1/0025 |

* cited by examiner

[Fig. 1]
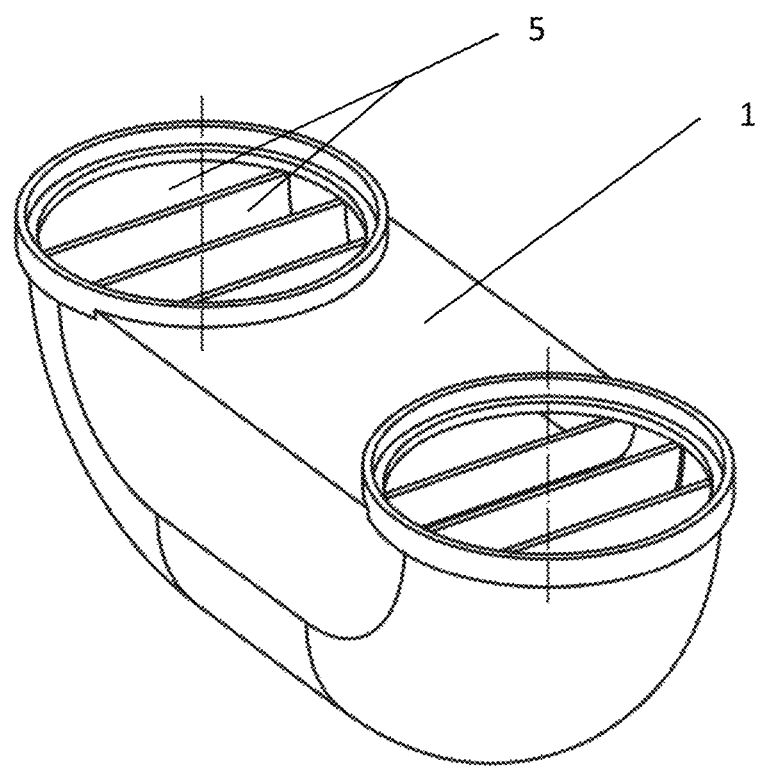

[Fig. 2]
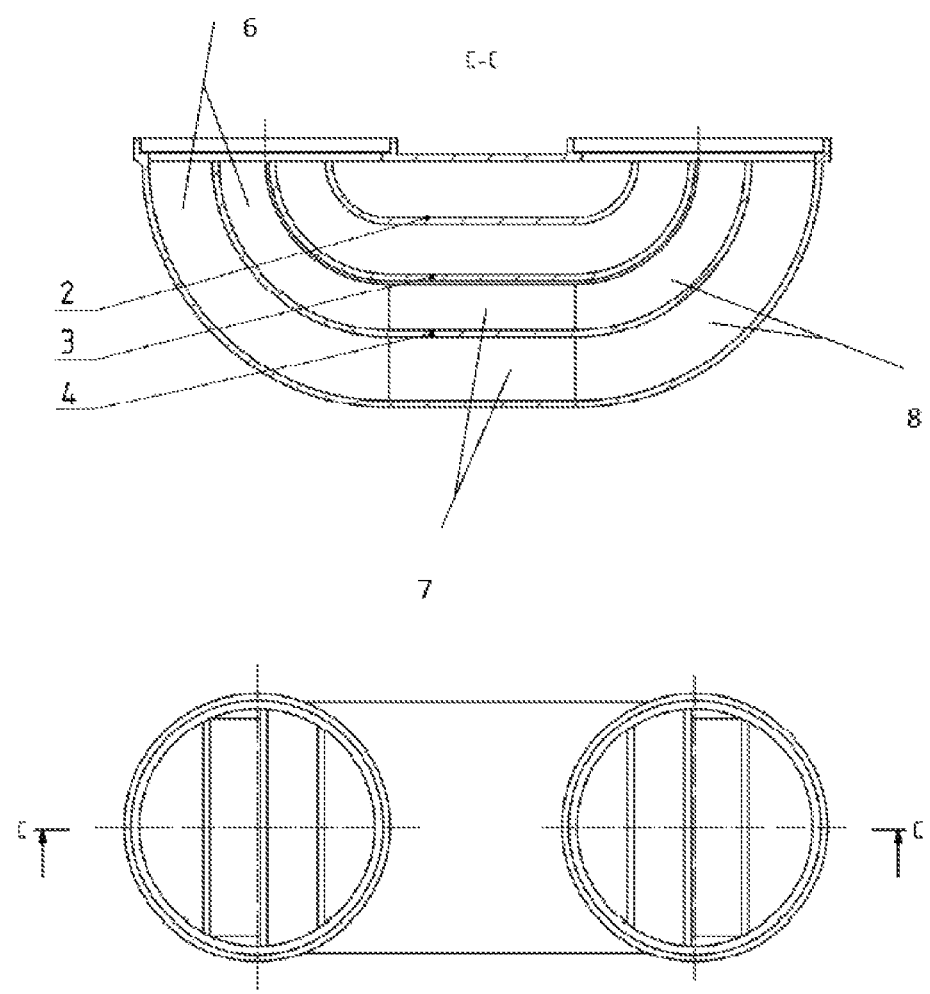

[Fig. 3]
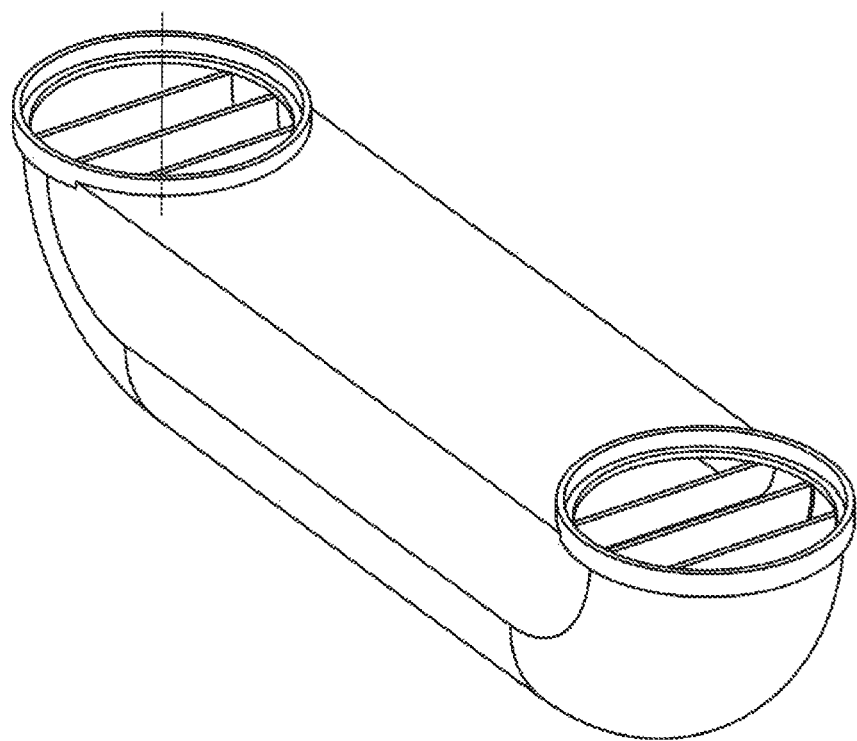
[Fig. 4]
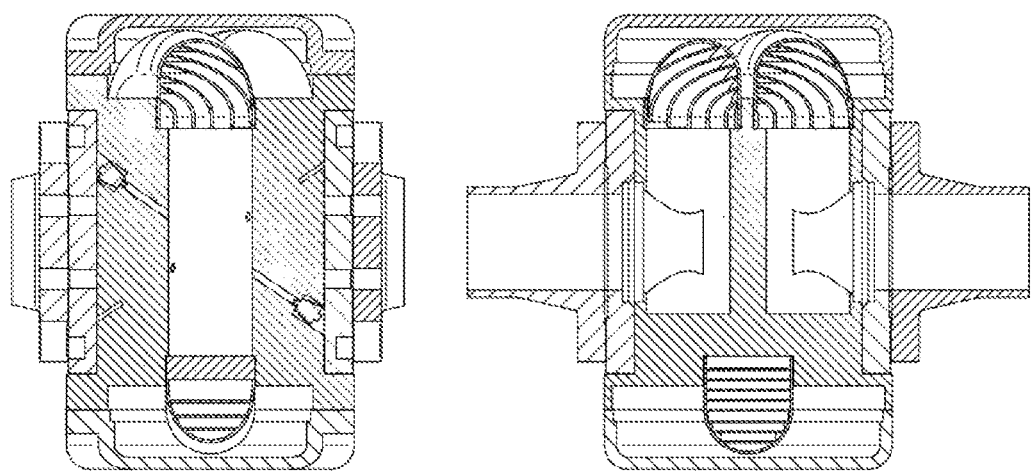

GAS FLOW CONDITIONER IN THE FLOW BEND, ESPECIALLY FOR ULTRASONIC GAS METER

BACKGROUND AND SUMMARY

The technical solution refers to a gas flow conditioner in a flow bend, i.e. a segment, arc or elbow, etc., where the direction of gas flow bends, upstream or downstream of a measuring part. This solution is used for gas measurement with ultrasonic gas meters, especially in natural gas distribution.

All gas flow conditioners are currently being placed in a straight pipe upstream of the ultrasonic gas meter. Measurement with ultrasonic sensors is carried out at some distance from this conditioner after the flow has stabilised. Any bending will cause flow disturbances that negatively affect the measurement accuracy of the ultrasonic gas meters.

There is no conditioner for the ultrasonic gas meter that could be placed in the bend of the gas flow.

The main disadvantages of the existing conditioners for ultrasonic gas meters include the fact that they can only be used in straight pipelines, and the measuring section with ultrasonic sensors must be located at some distance downstream of the conditioner. The existing conditioners cause a significant pressure loss and become clogged with various particles of dirt, especially in small openings thereof. For the existing conditioners, production thereof is expensive and usually one-off. The existing conditioners are usually not being placed directly in the meter body but at a certain distance upstream of the meter, up to 10 DN. Any bend between the flow conditioner and the measuring section will cause large flow disturbances, i.e. the formation of swirls, which have a negative impact on the accuracy and range of measurement.

There are several flow conditioner designs for ultrasonic gas meters, the most common of which is a perforated-plate conditioner placed at some distance upstream of the ultrasonic sensor measuring section. This conditioner develops a so-called "laminar velocity profile". This laminar velocity profile is suitable for measurements on large pipe dimensions, at high pressure and flow rates. An ultrasonic gas meter designed to measure on the laminar profile must have a large number of ultrasonic sensors. Such an ultrasonic gas meter design is expensive and only suitable for large pipe diameters.

Various other types of flow conditioners are known from technical practice. In particular, these include the Zanker's flow conditioner, Zanker's plate flow conditioner, Sprekle's flow conditioner, Gallagher's flow conditioner, K-Lab NOVA flow conditioner, NEL (Spearman's) flow conditioner, etc. The above flow conditioners have a significant pressure loss, must be placed in a straight pipe upstream of the ultrasonic gas meter and are complex and expensive to manufacture.

The principle of the ultrasonic gas meter is based on measuring the velocity of ultrasonic waves, i.e. signals, in the direction and the opposite direction of the gas flow. The ultrasonic sensors are located obliquely to the pipe axis, and the flow time between the transmitter and the receiver of the signal is measured. The ultrasonic signals are accelerated or decelerated by the flowing gas. From the different times, the mean gas flow velocity or flow rate or flow quantity is The above deficiencies are eliminated mainly by a gas flow conditioner in a flow bend, such as a segment, arc, or elbow, particularly in an ultrasonic flow meter, according to the present invention. The summary thereof is that at least one longitudinal dividing plate is provided in the inner space of the flow bend.

The flow bend is preferably provided with an inlet curved section, a middle straight section and an outlet curved section, wherein the axes of the inlet curved section and the outlet curved section are in a parallel direction and connected to the pipe opening of nominal diameter DN.

At least one longitudinal plate is placed in the flow bend symmetrically with respect to the flow bend axis or asymmetrically with respect to the flow bend axis. The axis of the middle straight section may be positioned in the horizontal direction or the vertical direction. The Reynolds number for DN-sized piping is higher than 2,320.

The summary of the invention is to propose a new solution for a flow conditioner, which consists of or comprises curved plates in the number of 1 to n pieces, which creates a turbulent flow, eliminating flow disturbances, such as swirls, and reducing pressure loss.

In turbulent flow, the velocity profile is very flat and the gas flows at almost the same velocity over most of the flow cross-section. The kind of flow produced is determined by the so-called Reynolds number Re. This is a dimensionless number, and the theoretical limit is set by the value 2,320. Below this value, we speak of laminar flow, and above this value, we speak of turbulent flow. The invention solution aims for the value of ReD, i.e. the Reynolds number for the DN-sized pipe, to be significantly higher than the theoretical limit.

The plates' number, shape, and positioning are carried out based on measurement by numerical simulation method and Particle Image Velocimetry-PIV. This method will illustrate where the plates are appropriate to be placed and what the ideal thickness of the plates is. The number of plates can be varied depending on the operating conditions and customer specifications.

The advantages of the solution, according to the invention, are primarily in that it eliminates the effect of small and large disturbances arising in the pipeline upstream of the gas meter. The solution is suitable to be used in a section of the pipeline where the direction of gas flow changes. The measuring section with ultrasonic sensors may be placed almost just behind this conditioner. The designed conditioner reduces the pressure loss. A significant advantage is that the conditioner is not clogged with various impurities because the openings used are sufficiently large.

The conditioner can be easily and inexpensively manufactured, even in large-scale production. The conditioner is suitable to be placed inside a compact ultrasonic gas meter, and, thus, the required construction length, i.e. the dimension between the flanges, can be achieved. The solution eliminates the flow disturbances arising in the bend, thus ensuring high accuracy and a large measuring range with ultrasonic sensors. The conditioner needs no maintenance as it is designed in materials such as aluminium or plastic, which are not subject to wear and tear and corrosion. The shape of the conditioner does not allow dirt to accumulate. The lifetime of the conditioner is the same as that of the ultrasonic gas meter; therefore, there is no increase in the cost of ownership of the meter. The conditioner can be made of a single material and can be removed from the gas meter, which considerably simplifies separation and subsequent recycling at the end of the service life thereof.

BRIEF DESCRIPTION OF DRAWINGS

The flow conditioner, according to the present invention, is described in more detail in a particular example embodiment referring to the accompanying drawings, wherein FIG. 1 shows an exemplary flow conditioner, in particular for natural gas, in axonometric view. FIG. 2 shows a segment with the conditioner in cross-section and plan view. FIG. 3 shows a longer embodiment of the flow conditioner, particularly for natural gas, in axonometric view. Specific use of conditioners with curved plates is shown in FIG. 4, depicting longitudinal sections of ultrasonic gas meters.

DETAILED DESCRIPTION

The exemplary flow conditioner in the bend segment, shown in FIGS. 1 and 2, comprises bend segment 1 with three longitudinal plates 2, 3 and 4. The segment is shaped to allow a change in the flow direction of up to 180°, i.e. the flow direction upstream of the segment is opposite to the flow direction downstream of the segment. The segment is fitted onto two parallel pipes, i.e. two parallel circular openings. The distance between the pipes can be chosen arbitrarily; the distance between the pipes does not affect the function of the flow conditioner-FIG. 3.

The plates 2, 3, 4 are shaped according to the shape of bend 1 of the segment and consist of or comprises three sections—the inlet curved section 6, the middle straight section 7, and the outlet curved section 8. The radius of curvature is chosen to create the desired velocity profile.

The position of plates 2, 3, 4 can be proportional, or the plates 2, 3, 4 are placed more densely to one side to achieve the optimum velocity profile. The conditioner can be placed in both horizontal and vertical directions. The conditioner can be used for different DN sizes of the pipe. The number of plates 2, 3, 4 will depend on the DN size. For the smallest size, there will be 1 or 2 plates; with a larger size, the number of plates will increase, e.g. 3 to n.

The conditioner can be made of various materials, e.g. plastic, metal, etc. Possible manufacturing technologies include 3D printing of plastics and metals, metal welding, plastic injection moulding, etc. The material and technology used will always depend on the requirements of the specific market. The position of the plates is determined by the required measuring range of the gas meter.

This flow conditioner will be placed in the compact ultrasonic gas meter, see application CZ PV 2019-161.

The flow conditioner, according to the present invention, will find the application thereof primarily in gas measurement, in ultrasonic flow meters, in particular in natural gas distribution in households, municipal and industrial buildings and the like.

The invention claimed is:

1. A gas flow conditioner in a flow bend in an ultrasonic flow meter, wherein a plurality of longitudinal dividing plates are provided in an inner space of the flow bend, and the flow bend is provided with an inlet curved section, a middle straight section and an outlet curved section, wherein
   the inlet curved section is a section from the entrance of the inner space to one end of the middle straight section;
   the outlet curved section is a section from the other end of the middle straight section to the exit of the inner space,
   the plurality of longitudinal dividing plates are arranged continuously from the entrance to the exit of the inner space, wherein the plurality of longitudinal dividing plates cause flow turbulence to reduce pressure loss.

2. The gas flow conditioner according to claim 1, wherein the flow bend is provided with an inlet curved section, a middle straight section and an outlet curved section, wherein axes of the inlet curved section and the outlet curved section are in a parallel direction and connected to a pipe opening of size DN.

3. The gas flow conditioner according to claim 2, wherein the axis of the middle straight section is in a horizontal direction.

4. The gas flow conditioner according to claim 2, wherein the axis of the middle straight section is in a vertical direction.

5. The gas flow conditioner according to claim 2, wherein a Reynolds number for the DN-sized pipe is higher than 2,320.

6. The gas flow conditioner according to claim 1, wherein at least one longitudinal plate is symmetrically positioned in the flow bend with respect to an axis of the flow bend.

7. The gas flow conditioner according to claim 1, wherein at least one longitudinal plate is asymmetrically positioned in the flow bend with respect to an axis of the flow bend.

* * * * *